United States Patent [19]

Ackerley et al.

[11] 4,020,106
[45] Apr. 26, 1977

[54] METAL EXTRACTION PROCESS
[75] Inventors: Norman Ackerley; Peter Albert Mack, both of Manchester, England
[73] Assignee: Imperial Chemical Industries Limited, London, England
[22] Filed: Aug. 12, 1975
[21] Appl. No.: 603,968

Related U.S. Application Data

[63] Continuation of Ser. No. 340,922, March 13, 1973, abandoned.

[30] Foreign Application Priority Data

Mar. 21, 1972 United Kingdom ............ 13158/72

[52] U.S. Cl. .................. 260/566 A; 260/429 C; 260/429.7; 260/429.9; 260/430; 260/431; 260/438.1; 260/438.5 R; 260/439 R; 260/465 D; 260/465 E; 260/471 R; 260/558 R; 260/558 D; 260/559 R; 260/561 R; 423/24; 423/100; 423/139
[51] Int. Cl.² ............... C07C 131/00; C07C 131/14

[58] Field of Search ............................... 260/566 A

[56] References Cited

OTHER PUBLICATIONS

Parrish, "J. S. African Chem-Inst." vol. 23 pp. 129-135 (1970).

*Primary Examiner*—Gerald A. Schwartz
*Attorney, Agent, or Firm*—Cushman, Darby & Cushman

[57] ABSTRACT

Salicylaldoximes having a total of at least three alkyl carbon atoms contained in one or more nuclear substituents are used to extract metals from aqueous solutions of their salts as complex compounds soluble in water-immiscible organic solvents. The salicylaldoximes are prepared from the corresponding salicylaldehydes by reaction with hydroxylamine.

1 Claim, No Drawings

METAL EXTRACTION PROCESS

This is a continuation, of application Ser. No. 340,922 filed Mar. 13, 1973 now abandoned.

This invention relates to an improved process for extracting metals for aqueous solutions containing these metals and in particular from such solutions obtained in the course of extracting metals from their ores.

One of the methods of extracting metals from these ores is to crush the ore and extract it with for example acids to give an aqueous solution of a salt of the desired metal, usually together with salts of other metals also present in the ore. The aqueous solutions may then be treated with a ligand which with the desired metal under the conditions of treatment will form a complex compound which is soluble in a water-immiscible organic solvent and estracting the metal as the complex compound in a suitable such organic solvent. It is convenient to use a solution of ligand in the solvent and to carry out the treatment and extraction simultaneously. It has now been discovered that certain salicylaldoximes are especially valuable as ligands for use in this extraction method.

According to the invention there is provided a process for extracting metal values from aqueous solutions which comprises treating the aqueous solution with a solution in a water-immiscible organic solvent of a salicylaldoxime of the formula

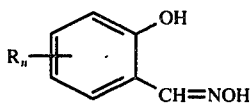

wherein each R, which may be the same or different, is a halogen atom or a nitro or cyano group, or a primary, secondary or tertiary amino, alkyl, alkenyl, cycloalkyl, aryl, aralkyl, alkoxy, aryloxy, aralkoxy or acyloxy group or substituted derivative thereof, $n$ is an integer of value from 1 to 4, and containing a total of at least 3 alkyl carbon atoms in the groups R, and separating from the aqueous phase the organic solvent containing the metal in the form of a complex with a salicylaldoxine in solution in or association with the organic solvent.

As examples of atoms or groups which may be represented by R there are mentioned halogen atoms such as chlorine or bromine and groups such as alkyl, cycloalkyl eg cyclohexyl, alkylamino, dialkylamino, arylamino, alkyloxycarbonyl, aryloxycarbonyl, aralkyloxycarbonyl, acylamido e.g. isodecanoylamido and stearoylamido, aroylamido, alkylaminocarbonyl, aralkylaminocarbonyl, acyloxy, aroyloxy, alkyloxy, aryloxy and aralkyloxy. An alkyl group or alkyl component of any of the foregoing groups may contain any number of carbon atoms and may be primary, secondary or tertiary and either straight-chain or branched, for example methyl, ethyl, n-propyl, isopropyl, n-butyl, tert-butyl, isooctyl, nonyl, isodecyl or dodecyl, and may optionally be substituted e.g. trifluoromethyl. Any aryl group is preferably a phenyl group which may be optionally substituted. As an example of an aralkyl group there may be mentioned benzyl.

The value of $n$ is preferably 1 or 2.

Salicylaldoximes containing a total of at least 5 alkyl carbon atoms are preferred and especially those containing a straight chain or branched alkyl groups having at least 8 carbon atoms owing to their high solubility in the organic solvent. The solvent solubility can be still further enhanced by using mixtures of aldoxines having different groups R. A particularly valuable salicylaldoxime mixture is that in which R is a mixture of branched nonyl groups derived from propylene trimer when condensed with a phenol.

These salicylaldoximes are new substances and are a further feature of the invention.

As examples of salicylaldoximes which may be used in the process of the invention there may be mentioned 5-tert-butyl-2-hydroxybenzaldoxime, 5-dodecyl-2-hydroxybenzaldoxime, 3,5-di-tert-butyl-2-hydroxybenzaldoxime, 5-dodecyl-2-hydroxybenzaldoxime 5-octyl-2-hydroxybenzaldoxime, 3,5-di-tert-pentyl-2-hydroxybenzaldoxime, and 5-nonyl-2-hydroxybenzaldoxime.

The salicylaldoximes may be obtained by conventional means, for exmple reaction of hydroxylamine (e.g., as hydrochloride in presence of sodium acetate) with the corresponding salicylaldehydes, themselves obtained by conventional methods by for example introduction of a formyl group into the ortho position of an appropriate substituted phenol.

The process may be applied to the extraction of any metal which is capable of forming a suitable lyophilic complex compound which is soluble in or wholly associated with the organic solvent. As examples of such metals there may be mentioned cobalt, nickel, vanadium, chromium zinc, tin, cadmium, sliver, gold, mercury, and, especially, copper.

The conditions, particularly pH, under which the process is used are chosen to suit the metal or metals present in the aqueous solution. It is generally desirable that under the chosen conditions any other metals present should not form stable complex compounds with the salicylaldoxime in order that substantially only the desired metal is extracted from the aqueous solution. Since formation of the complex compound may involve the liberation of acid, it may be necessary to add, e.g., alkali during the process to maintain the pH within the desired range in which the metal complex is stable. These salicylaldoximes are especially suitable for the extraction of copper since this metal forms a complex which is stable at low pH values and by operating at pH below 3 copper can be extracted substantially free from iron, cobalt, and nickel.

As organic solvent there may be used any mobile organic solvent or mixture of solvents which is immiscible with water and, under the pH conditions used, inert to water and to the ligands, for example alphatic and aromatic hydrocarbons, esters, ethers, and halogenated hydrocarbons.

In order to facilitate separation of the aqueous and solvent phases it is desirable to use a solvent having a significantly different density when containing the salicylaldoxime and complex from that of the aqueous layer.

If the solvents contain suspended complex compounds which may tend to sink to the bottom of the solvent layer it is particularly preferred to use solvents which are more dense than the aqueous solutions since these are easier to separate from the aqueous layer than solvents less dense than water in which the suspended complex may tend to concentrate near the solvent-water interface. Examples of such dense solvents are halogenated hydrocarbons such as perchloroethylene, trichloroethane, trichloroethylene and chloroform.

The process may conveniently be carried out by bringing together the aqueous solution and the solution of the salicylaldoximo in the organic solvent at a suitable temperature, conveniently ambient temperature, agitating or otherwise disturbing the mixture of liquids so that the area of the water-solvent interfacial layer is increased in order to promote complex formation and extraction, and then decreasing the agitation or disturbance so that the acqueous and solvent layers settle and can be conveniently separated. The process may be carried out in a batchwise manner or preferably continuously, in either case the solvent being if desired stripped of the metal content before re-use.

The amount of organic solvent to be used may be chosen to suit the volume of aqueous solution to be extracted, the concentration of metals, and the plant available to carry out the process. It is not in general necessary to use an amount of solvent sufficient to ensure complete solution of the complex formed, since any complex in excess of that in solution will usually remain as a suspension in the organic solvent and will not interfere with the handling and separation of the solvent layer, especially if this is more dense than the aqueous layer. It is preferred, especially when operating the process continuously, to bring together approximately equal volumes of the organic solution and the aqueous solution.

If desired mixtures of salicylaldoximes and other ligands may be used, and other compounds, such as conditioners for example long chain aliphatic alcohols such a capryl alcohol, isodecanol, tridecyl alcohol or 2-ethylhexanol which assist or modify the formation and extraction of the complex compound, may also be present, suitably in amounts from 0.5 to 10% by weight of the organic solvent.

The addition of surface active agents such as ethylene oxide/alkyl phenol condensates is sometimes desirable in order to assist separation of the aqueous and organic phases by reducing any tendency to emulsification.

It is preferred to use solvent solutions containing from 2 to 50% of the salicylaldoxime.

The metal may be isolated from the solvent after the extraction stage by any conventional process, for example by extraction into an aqueous phase under pH conditions in which the complex is unstable, or by hydrogenation. Such treatment will regenerate the salicylaldoxime and the solvent containing the salicylaldoxime so recovered may conveniently be re-used in the process, especially when operated continuously.

The process of the invention may be applied especially to aqueous solutions resulting from treatment of mineral ores, scrap metal or other metal-containing residues with aqueous acids such as sulphuric, sulphurous, hydrochloric, or nitric acids or for example with aqueous ammonia, ammonium carbonate or to metal containing spent liquors from electrolytic or chemical processes.

It is in general particularly suitable for the recovery of copper from solutions containing at least 5 g of copper per liter. Salicylaldoximes containing alkyl groups in the position ortho to the hydroxy group are however more suitable for use with weaker solutions.

The invention is illustrated but not limited by the following Examples in which all parts and percentages are by weight unless otherwise stated.

EXAMPLE 1

20 parts by volume of an aqueous copper sulphate solution at pH 2 containing 45 g of copper per liter were shaken with 60 parts by volume of a solution containing 7.4 parts by weight of 5-nonyl-2-hydroxybenzaldoxime in a hydrocarbon solvent with the trade name Shellsol T for 3 minutes at ambient temperature. The aqueous phase was separated from the hydrocarbon solution and found to contain 10.82 g of copper per liter. This aqueous phase was then extracted a second time with a fresh solution of 5-nonyl-2-hydroxybenzaldoxime. The aqueous solution from the second extraction was found to contain 1.23 g of copper per liter. A third extraction reduced the copper concentration in the aqueous solution to 0.086 g per liter.

The 5-nonyl-2-hydroxybenzaldomixe used in this example was prepared as follows:

A mixture of 270 parts of 4-nitroso-N,N-dimethylaniline, 600 parts of a 40% aqueous solution of formaldehyde, 1700 parts of methyl alcohol and 440 parts of commercial grade 4-nonylphenol wherein the nonyl group is a mixture of branched chain isomers (prepared by alkylation of phenol with propylene trimer), was stirred while a vigorous stream of hydrochloric acid gas was introduced. The temperature of the mixture quickly rose to between 55° and 60° C. The mixture was allowed to reflux at this temperature for between 1 and 2 hours after which the exothermic reaction abated. The flow of hydrochloric acid gas was stopped and steam passed into the reaction mixture with the condenser changed from the reflux position to a distillation position. After about 700 parts of distillate had been collected 500 parts of water were added to the distillation residue and the mixture allowed to separate. The aqueous phase was removed and the residual oil distilled under vacuum. The fraction distilling within the range 135°–145° C at 0.6 mm. pressure was collected and refluxed together with 404 parts of hydroxylamine hydrochloride, 570 parts of potassium acetate and 1090 parts of ethyl alcohol for 2 hours. The mixture was then filtered and the inorganic cake washed with 500 parts of ethyl alcohol. The filtrates were evaporated to remove the alcohol and the residual syrup dissolved in 500 parts of chloroform. This solution was washing by shaking with water and then the chloroform removed in a rotary evaporator. The residue consisted of 350 parts of 5-nonyl-2-hydroxybenzaldoxime as a viscous straw-colored liquid, the i.r. spectrum of which had significant peaks at 3400 and 1625 $cm^{-1}$.

EXAMPLE 2

60 parts by volume of a solution containing 7.4 parts by weight of 5-nonyl-2-hydroxybenzaldoxime in a hydrocarbon solvent with the trade name Shellsol T were agitated vigorously for 5 minutes with 20 parts by volume of an aqueous feed solution containing divalent metal sulphates initially at pH 2 and ambient temperature. The phases were separated and the hydrocarbon solution was contacted successively with 2 more portions of fresh aqueous feed solution. The initial aqueous feed solutions contained 45000 p.p.m. of copper, 2000 p.p.m. of iron, 2000 p.p.m. of cobalt and 200 p.p.m. of zinc. After the three extractions the hydrocarbon solvent was found to contain 14000 p.p.m. of copper, 5 p.p.m. of iron, 1 p.p.m. of cobalt, and less that 1 p.p.m. of zinc.

EXAMPLE 3

100 parts by volume of an aqueous solution at pH 2 containing 3000 p.p.m. of copper as the divalent metal sulphate were shaken with 100 parts by volume of a solution containing 2.6 parts by weight of 3,5-ditert-pentyl-2-hydroxybenzaldoxime in kerosene for 5 minutes at ambient temperature. On standing, the two phases had completely separated in 15 seconds. Analysis showed the organic phase to contain 1350 p.p.m. of copper and the remaining 1650 p.p.m. of copper were left in the aqueous phase which now had a pH of 1.49. This aqueous phase was then shaken with a further 100 parts by volume of the 3,5-di-tert-pentyl-2-hydroxybenzaldoxime solution. After separation the organic phase was found to contain 540 p.p.m. of copper and the aqueous phase which had a pH of 1.38 contained 1110 p.p.m. of copper. This aqueous phase was extracted a third time with the same volume of fresh 3,5-di-tert-pentyl-2-hydroxybenzaldoxime solution. The organic phase contained 410 p.p.m. of copper and the aqueous phase with a pH of 1.3 contained 700 p.p.m. of copper.

The 3,5-di-tert-pentyl-2-hydroxybenzaldoxime used in this Example was prepared by a method analogous to that used in Example 1 for the preparation of 5-nonyl-2-hydroxybenzaldoxime but in which the 440 parts of 4-nonylphenol were replaced by 468 parts of 2,4-di-tert-pentylphenol. This gave a yield of 346 parts of 3,5-di-tert-pentyl-2-hydroxybenzaldoxime as a straw colored liquid which partially crystallized on standing at room temperature.

EXAMPLE 4

100 parts by volume of a solution containing 2.6 parts by weight of 3,5-ditert-pentyl-2-hydroxybenzaldoxime in kerosene were shaken with 3 successive portions of aqueous copper sulphate solution each portion consisting of 100 parts of solution at pH 2 containing 3 parts by weight of copper where 0.234 parts by weight of copper were extracted into the kerosene solution. This solution was then agitated with 100 parts by volume of an aqueous solution containing 30 g of copper and 150 g of sulphuric acid per liter for 5 minutes at ambient temperature and allowed to settle. The kerosene phase was separated and the extraction repeated twice with fresh portions of aqueous solution containing 30 g of copper and 150 g of sulphuric acid per liter. The resulting kerosene solution contained only 0.0033 parts by weight of copper. The net transfer efficiency, i.e., the difference between the copper extracted into the organic solution from the dilute copper solution and the copper remaining in the organic solution after contact with the acid solution, expressed as a percentage of the theoretical capacity for copper of the organic solution, is 77.5%.

EXAMPLE 5

100 parts by volume of a solution containing 12.3 parts by weight of 5-nonyl-2-hydroxybenzaldoxime prepared as described in Example 1 in a hydrocarbon solvent with the trade name Shellsol T were shaken with successive portions of aqueous copper sulphate solution until 1.38 parts by weight of copper had been extracted into the hydrocarbon solvent. Copper was stripped from the loaded hydrocarbon solution at ambient temperature by two successive 5 minute extractions with strip solutions consisting of 100 parts by volume of a solution containing 30 g of copper and 200 g of sulphuric acid per liter. In this way 0.75 parts by weight of copper was transferred from the hydrocarbon solvent to the strip solutions, i.e., the net transfer efficiency was 50.5%.

EXAMPLE 6

50 parts by volume of an aqueous solution at pH 2 containing 12000 p.p.m. of copper as the divalent sulphate were shaken with 50 parts by volume of a solution containing 9.1 parts by weight of 5-dodecyloxy-2-hydroxybenzaldoxime in chloroform an ambient temperature until equilibrium was reached. The mixture was allowed to separate into an aqueous phase which was found to contain 36 p.p.m. of copper and a suspension of solid complex wholly associated with the chloroform phase.

The 5-dodecyloxy-2-hydroxybenzaldoxime used in this Example was prepared by a method analogous to that used in Example 1 for the preparation of 5-nonyl-2-hydroxybenzaldoxime but in which the 440 parts of 4-nonylphenol were replaced by 558 parts of 4-dodecyloxyphenol. This gave a yield of 189 parts of 5-dodecyloxy-2-hydroxybenzaldoxime, which after crystallisation from light petroleum was obtained as a waxy solid melting at 60° C and containing 3.8% of nitrogen ($C_{19}H_{31}O_3N$ requires 4.4% of nitrogen).

EXAMPLE 7

100 parts by volume of an aqueous solution at pH 2 containing 12000 p.p.m. of copper as the divalent sulphate were shaken with 100 parts by volume of a solution containing 10.8 parts by weight of 5-tert-butyl-2-hydroxybenzaldoxime in chloroform at ambient temperature. After 5 minutes the aqueous phase was separated and found to have a pH of 1.1 and contained 124 p.p.m. of copper. This aqueous solution was then contacted with a fresh 100 parts of chloroform solution containing 10.8 parts of 5-tert-butyl-2-hydroxybenzaldoxime. The resultant aqueous solution was found to contain 31 p.p.m. of copper and have a pH value of 1.06.

The 5-tert-butyl-2-hydroxybenzaldoxime used in this Example was prepared by a method analogous to that used in Example 1 for the preparation of 5-nonyl-2-hydroxybenzaldoxime in which the 440 parts of 4-nonylphenol were replaced by 300 parts of 4-tert-butylphenol. This gave a yield of 169 parts of 5-tert-butyl-2-hydroxybenzaldoxime. Crystallization from light petroleum afforded a white solid, melting at 116°–118° C.

EXAMPLE 8

100 parts by volume of a solution containing 7.2 parts by weight of 5-tert-butyl-2-hydroxybenzaldoxime in chloroform were shaken with successive portions of aqueous copper sulphate solutions until 1.12 parts by weight of copper had been extracted into the chloroform solution. This copper loaded solution was then stripped by agitating with 100 parts by volume of an aqueous solution containing 30 g of copper and 250 g of sulphuric acid per liter for 5 minutes at ambient temperature. After the mixture had settled it was found that 0.94 parts of copper had been transferred from the chloroform solution to the aqueous strip solution, i.e., the net transfer efficiency was 79%.

What we claim is:
1. A mixture of 5-nonyl-2-hydroxy benzaldoximes wherein the nonyl is a mixture of branched chain isomers.

* * * * *